(12) United States Patent
Chen et al.

(10) Patent No.: US 7,636,436 B2
(45) Date of Patent: Dec. 22, 2009

(54) METHOD FOR THE PERFORMANCE TESTING OF ECHO CANCELLERS USING AN ARTIFICIAL SEGMENTED TEST SIGNAL

(75) Inventors: Bing Chen, Westfield, NJ (US); James H. James, Farmingdale, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 967 days.

(21) Appl. No.: 10/740,102

(22) Filed: Dec. 17, 2003

(65) Prior Publication Data

US 2004/0228454 A1 Nov. 18, 2004

Related U.S. Application Data

(60) Provisional application No. 60/470,666, filed on May 15, 2003.

(51) Int. Cl.
H04M 9/08 (2006.01)
(52) U.S. Cl. .................................................. 379/406.1
(58) Field of Classification Search ..................... 379/3, 379/406.1
See application file for complete search history.

(56) References Cited

U.S. PATENT DOCUMENTS 5,621,854 A   4/1997   Hollier
5,890,104 A   3/1999   Hollier
6,580,795 B1 *  6/2003   Li et al. .................. 379/406.14
6,687,723 B1 *  2/2004   Ding ........................... 708/322

* cited by examiner

Primary Examiner—Alexander Jamal
(74) Attorney, Agent, or Firm—Hoffmann & Baron, LLP (57) ABSTRACT

A method for the performance testing of an echo canceller including the steps of transmitting a test signal to the echo canceller, recording an echo energy signal output from the echo canceller as a result of the test signal, measuring the energy and duration of the echo energy signal and calculating a performance score for the echo canceller based on the measured energy and duration of the echo energy signal, wherein the test signal transmitted to the echo canceller has a plurality of discrete frequency band segments of white noise representing sub-bands of an overall bandwidth ranging from about 0 kHz to about 3.5 kHz. The test signal preferably has four discrete frequency band segments of white noise, wherein each discrete frequency band segment of the test signal is repeated in succession, whereby the test signal has a total of eight segments. Thus, the test signal can have a first frequency band segment having a bandwidth of about 0 kHz to about 1 kHz, a second frequency band segment having a bandwidth of about 1 kHz to about 2 kHz, a third frequency band segment having a bandwidth of about 2 kHz to about 3 kHz and a fourth frequency band segment having a bandwidth of about 3 kHz to about 3.5 kHz.

26 Claims, 6 Drawing Sheets

METHOD FOR THE PERFORMANCE TESTING OF ECHO CANCELLERS USING AN ARTIFICIAL SEGMENTED TEST SIGNAL

CROSS-REFERENCE TO RELATED APPLICATIONS

This application claims the benefit of U.S. Provisional Application Ser. No. 60/470,666, filed May 15, 2003, the disclosure of which is incorporated herein by reference.

FIELD OF THE INVENTION

The present invention relates generally to communication systems and, more particularly, to a method for the objective performance testing of an echo canceller using a new artificial segmented test signal and echo measurement algorithm.

BACKGROUND OF THE INVENTION

All voice network service providers who want to introduce packet transport technology or any other technology (e.g., digital cellular) that increases connection delay beyond approximately 25 msec (round trip) need to deploy echo cancellers within their networks and these devices need to perform their function across a wide range of usage variation. The basic objective of a well-performing echo canceller (EC) is to quickly recognize an echo and then rapidly "converge" to cancel the echo by reducing it in level below the threshold of notice. Accordingly, it is very important to test an echo canceller (EC) prior to deployment in the network to ensure that it will perform to expectations.

A challenge in the area of echo canceller (EC) performance testing concerns what test signal(s) to use. Today, the standard EC test is based on International Telecommunication Union-Standardization Sector (ITU-T) Recommendations G.165 and G.168. ITU-T Recommendation G.165 recommended the use of band-limited (300-3400 Hz) white noise as the test signal. The updated, G.168 Recommendation defined and recommended a new test signal, the composite source signal (CSS) and the pass/fail criteria is based on results generated with this signal.

The CSS is a speech like signal in that it has a power density spectrum similar to that of speech, it is interrupted by gaps that simulate the pauses found in speech, and it simulates both voiced and unvoiced sounds. Like all good test signals, the CSS can also be specifically defined and, thus, constructed with fidelity in the different test labs. The CSS is generally regarded as a superior test signal to the white noise test signal that it replaces and performance seen with the CSS is assumed to be predictive of how the EC will perform in the presence of speech. However, there is ample evidence that shows that this prediction too often does not hold.

The existing "artificial" test signals used in the telecommunications industry for evaluating the performance of an echo canceller (EC) (i.e., those recommended by the ITU-T in Recommendations G.165 and G.168) frequently fail to predict how the echo canceller will perform in "real" uses (i.e., when the EC is working on actual speech signals). Specifically, testing an echo canceller with a CSS signal is not always predictive of its performance in the presence of speech. Consequently, pre-deployment performance testing of new EC designs does not provide the level of confidence desired in that the performance seen in the lab is not always the performance experienced in the field.

Since echo cancellers are deployed to control the echo of speech signals, the test signal of choice would seem to be a speech signal(s). It has been proposed to use a speech signal as the test signal, but there has been no agreement in the industry as to which speech signal to use. Speech signals vary widely from person to person and EC performance is sensitive to this variation.

Attempts to substitute speech signals in the G.168 testing reveal substantial performance variation driven by the specific speech sample in use. So it would appear that a sample of speech signals needs to be identified and used. This conclusion is not a satisfying one. G.168 EC testing is complicated enough with a single test signal in use. Trying to get general agreement to move to a sample of speech signals for testing is likely to be difficult if not impossible. Furthermore, to get lab-to-lab conformity, these signals would have to be shared since their independent reproduction is also not likely due to the complexity of real speech signals.

One approach to handling this complexity is to use multiple speech signals in an EC performance test and to score EC performance in terms of the results of a subjective mean-opinion-sore (MOS) test, where groups of test subjects listen to the processed speech samples and rate them in terms of their transmission quality based on the residual echo seen with the speech samples. The problem with this approach is that it does not provide the single, objective test signal needed to do routine testing and for setting objective performance requirements. Also, the MOS technique is rather expensive to implement and, under ideal conditions, can take days to conduct.

Accordingly, there is a need for an improved "objective" test signal for use in echo canceller performance evaluations. The currently used signals of band limited white noise and the CSS both have general utility but neither represent speech as well as they should. Thus, it would be desirable to provide an artificial test signal which generates performance that correlates highly with that observed with actual speech signals.

SUMMARY OF THE INVENTION

The present invention is a method for the performance testing of an echo canceller. The method generally includes the steps of transmitting a test signal to the echo canceller, recording an echo energy signal output from the echo canceller as a result of the test signal, measuring the energy and duration of the echo energy signal and calculating a performance score for the echo canceller based on the measured energy and duration of the echo energy signal, wherein the test signal transmitted to the echo canceller has a plurality of discrete frequency band segments of white noise.

In a preferred embodiment, the performance score is calculated by multiplying the measured energy and the measured duration of the echo energy signal and a pass/fail criterion can be developed based on the calculated performance score as compared to mean opinion score results of multiple speech sample testing. Also, the recorded echo energy signal preferably has a duration greater than about 5 msec and a level greater than about −50 dBm. Preferably, the steps of recording and measuring are repeated for each of a plurality of echo energy signals, wherein the performance score is calculated by summing the products of the measured energy multiplied by the measured duration for each of the echo energy signals.

The test signal of the present invention includes discrete frequency band segments representing sub-bands of an overall bandwidth ranging from about 0 kHz to about 3.5 kHz. In a preferred embodiment, the test signal has four discrete frequency band segments of white noise, wherein each discrete frequency band segment of the test signal is repeated in succession, whereby the test signal has a total of eight segments. Preferably, the test signal has a first frequency band segment representing white noise having a bandwidth of about 0 kHz to about 1 kHz, a second frequency band segment representing white noise having a bandwidth of about 1 kHz to about 2 kHz, a third frequency band segment representing white noise having a bandwidth of about 2 kHz to about 3 kHz and a fourth frequency band segment representing white noise having a bandwidth of about 3 kHz to about 3.5 kHz.

The test signal of the present invention further preferably has a plurality of discrete frequency band segments which are ordered within the test signal by increasing frequency. The plurality of discrete frequency band segments also preferably have an equal level of about −18 dBm and an equal duration of about 350 msec. The plurality of discrete frequency band segments of the test signal are further preferably separated from one another by a delay of about 150 msec and the level during the delay is about −65 dBm.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

Frequency variation is a major source of the between speech sample variation actually observed, especially across speaker gender and age. It has been found that to address the need for a more representative objective test signal, a test signal that combines the attributes of being objective (i.e., being definable at a level that allows others to recreate it with fidelity), and being representative of speech signals (i.e., that it generates convergence speed performance results that correlate very well with MOS results obtained with actual speech signals) is most desired.

Figure 1:
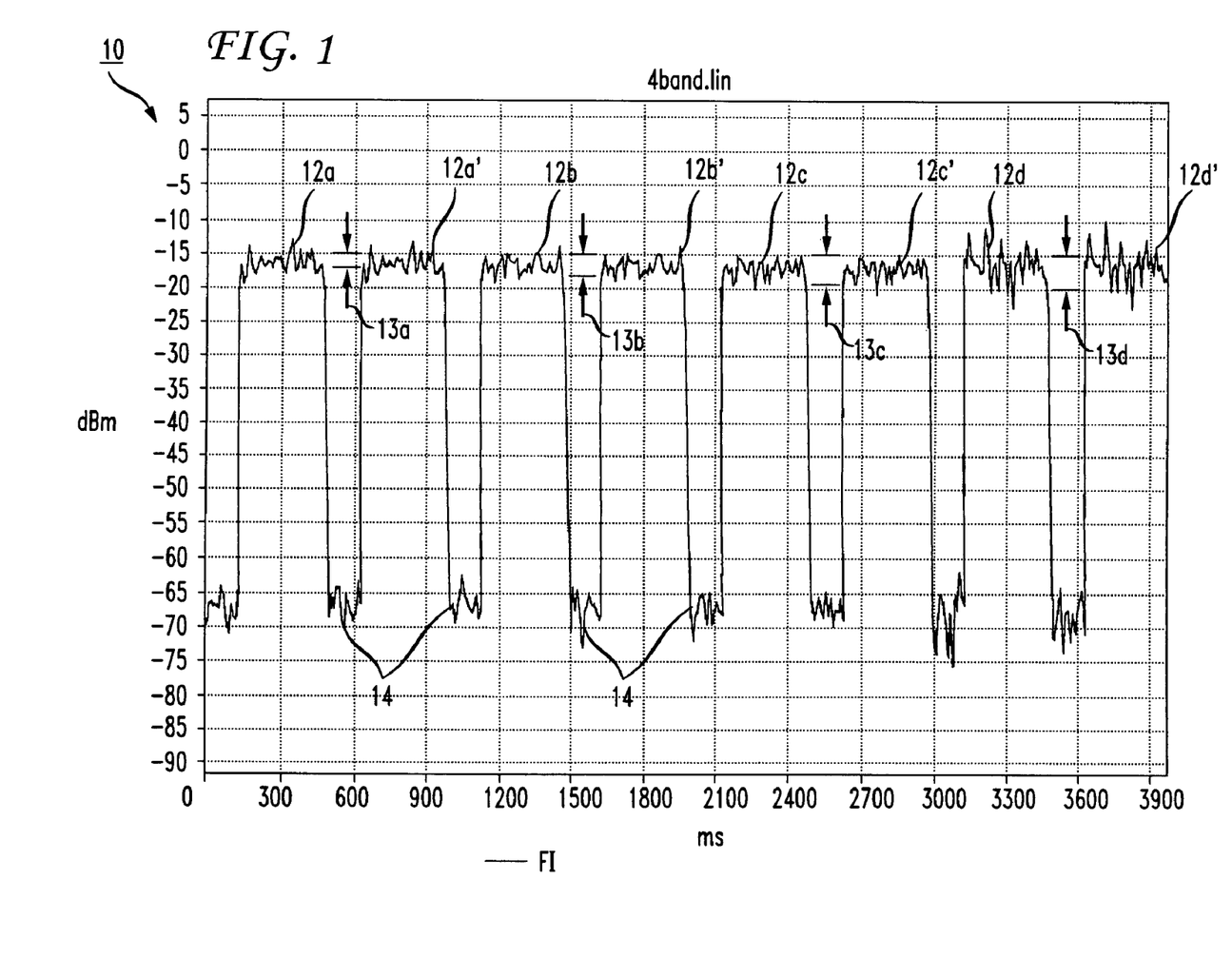
FIG. 1 is a graphical representation of the segmented test signal formed in accordance with the present invention.

FIG. 1 shows the new artificial test signal 10, for the objective performance testing of an echo canceller, formed in accordance with the present invention. The test signal 10 is a segmented white noise signal including four (4) separate time segments 12a, 12b, 12c and 12d of white noise (or white noise segments). The white noise segments 12a, 12b, 12c and 12d are associated with frequency sub-bands (or bands) of an overall frequency band ranging from about 0 kHz to about 3.5 kHz. Preferably, each white noise segment 12a, 12b, 12c and 12d appears twice in succession (or is paired), thus resulting in a signal 10 having eight (8) white noise segments 12a, 12a', 12b, 12b', 12c, 12c', 12d and 12d' as shown in FIG. 1. The four white noise segments 12a, 12b, 12c and 12d (including paired white noise segments 12a', 12b', 12c', 12d') are respectively associated with different frequency bands: 0-1 kHz 13a, 1-2 kHz 13b, 2-3 kHz 13c, and 3-3.5 kHz 13d. In the overall test signal 10, these white noise segments are ordered in terms of increasing frequency as shown in FIG. 1, such that the first white noise segment pair 12a, 12a' is associated with a first frequency band 13a of 0-1 kHz the second white noise segment pair 12b, 12b' is associated with a second frequency band 13b of 1-2 kHz, the third white noise segment pair 12c, 12c' is associated with a third frequency band 13c of 2-3 kHz and the fourth white noise segment pair 12d, 12d' is associated with a fourth frequency band 13d of 3-3.5 kHz. All white noise segments are preferably at a high-level of about −18 dBm and preferably have a duration of about 350 msec. Also, the white noise segments are preferably separated from one another by a low-level white noise delay or gap 14 of about 150 msec. It has been found that the high-level white noise segments approximate average speech over the public switched telephone network (PSTN) and the low-level white noise gaps 14 approximate pauses in speech patterns. Additionally, the white noise floor of the test signal 10 (or the white noise gaps 14) is preferably at a low-level of about −65 dBm. For short-hand convenience, the test signal 10 described above is termed as a 4-band signal 10 below.

Figure 2:
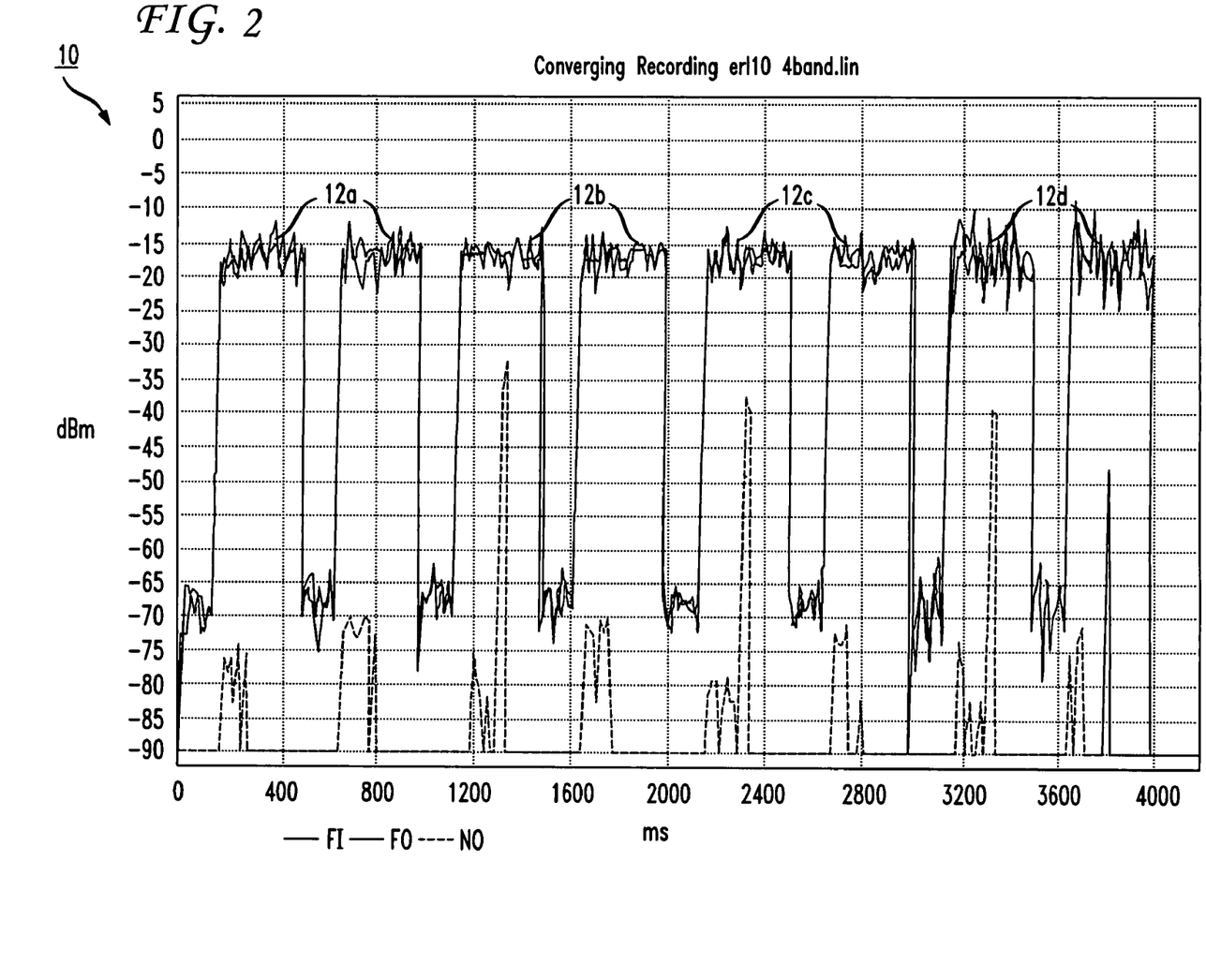
FIGS. 2 and 3 show some convergence speed results for two different echo cancellers in response to the 4-band signal formed in accordance with the present invention.
Figure 3:
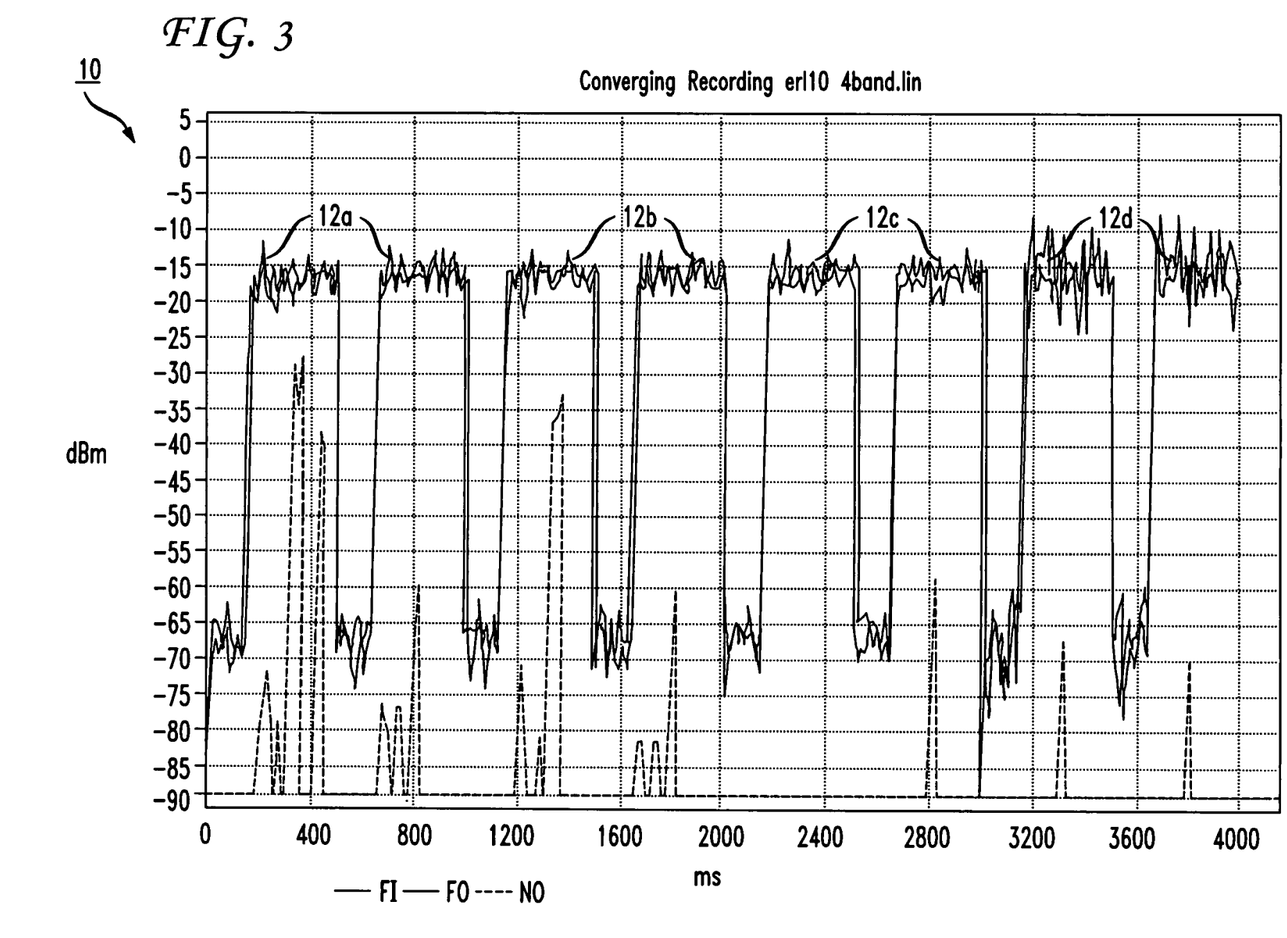

FIGS. 2 and 3 show some convergence speed results for two different echo cancellers (ECs) in response to the 4-band signal 10 formed in accordance with the present invention. The segmented test signal 10 passing though the EC in the send direction FI (G.168 term $S_{in}$) and NO (G.168 term $R_{out}$) EC ports is shown, as is the echo spikes leaking through the EC in the return direction FO port (G.168 term $S_{out}$). For the EC whose performance is shown in FIG. 2, there is no apparent initial echo at the lowest frequency band (0-1 kHz) of white noise segment 12a. In both the second frequency band (1-2 kHz) of white noise segment 12b and the third frequency band (2-3 kHz) of white noise segment 12c, a brief spike of echo is detected, but full convergence (no echo) is detected in the white noise segments 12b' and 12c'. In the fourth frequency band (3-3.5 kHz) of white noise segment 12d, a brief spike of echo is detected, and an even briefer, and attenuated, spike is detected in the white noise segment 12d'. The pre-convergence detected in the lowest frequency segment band of white noise segment 12a is possibly a result of that EC declaring that low frequency as noise.

The second EC shows a different convergence pattern as illustrated in FIG. 3. At the beginning of the test signal 10, initial echo is detected in the lowest frequency band of white noise segment 12a that is captured (converged on) during white noise segments 12a'. This same pattern is detected in the frequency band (1-2 kHz) of white noise segment 12b and white noise segment 12b'. Basically, no echo is detected in the next frequency bands of white noise segments 12c and 12d. Given the frequency-time confounding inherent in the test signal 10, it is unclear whether the particular design of this EC allows adaptive filter control gained at lower frequencies to cause the NLP to function immediately for the higher frequency energy or whether this EC is pre-converged for high frequency energy.

Nevertheless, these results show that the test signal 10 according to the present invention reveals convergence performance both within and between frequency bands. This is the type of sensitivity that is most desired in an echo canceller test signal.

To expand the utility of the new test signal 10, a new method for testing the performance of an echo canceller is also provided. The first requirement of any useful EC convergence performance measure is that it link to the customers' experience. The psychophysics of human hearing indicates that, in sound detection, energy over time is integrated within a time frame of roughly 200 ms and, in echo perception, both echo duration and intensity is factored. Accordingly, for accurate echo canceling performance testing, it would be desired to calculate both the echo spike energy and the energy spike duration and integrate these values into one performance number.

The method, according to the present invention, utilizes an associated algorithm that examines the convergence period energy escaping from an echo canceller's $S_{out}$ port and calculates a single statistic to represent this echo (Erep). Briefly, the new algorithm analyzes the residual echo energy (both power and duration) observed during performance testing and represents this echo energy in a single score that can be used to represent how well the echo canceller will perform in the presence of speech. Pass/fail criterion can then be developed based on correlation studies (measured echo to mean opinion score (MOS) results based on testing with multiple speech samples) that can serve as a new and more accurate requirement on echo canceller convergence speed.

For purposes of the present invention, an echo spike is defined as a burst of energy having a duration in excess of 5 ms and a level greater than −50 dBm. The −50 dBm threshold is based on much evidence that brief echo at and below −50 dBm has little negative subjective effects. Thus, one skilled in the art will recognize that this threshold is chosen empirically so as to maximize the predictive validity of the algorithm and that other thresholds may be used.

For each echo spike that exceeds the 5 ms/−50 dBm threshold, the algorithm multiplies the duration and energy to get a single score. Then, the algorithm sums the scores of such echo spikes to obtain an overall test score. The algorithm is expressed in the following equation:

$$\text{Erep} = a \, \Sigma t_i p_i; t_i \geq 5 \text{ ms};$$

where "$t_i$" is the ith echo spike duration (ms), "$p_i$" is the ith echo spike's average power level (dBm), "a" is an arbitrary scaling factor and "Erep" is the final score for the echo signal file. (A suitable scaling factor "a" for purposes of the present invention is 0.01.) Thus, the method according to the present invention includes the steps of calculating the power and the duration of each spike within a residual echo energy and then integrating the calculations over all the spikes seen to yield a single objective score. This algorithm may be advantageously implemented on programmable test equipment using a programmable computer, discrete digital circuits or application specific integrated circuits (ASICs).

Verification tests of the present invention show that the objective score achieved with the new test signal and algorithm is highly correlated (0.89) with the MOS results. Thus, the test result achieved with the method of the present invention is highly predictive of how well an EC will perform when acting on actual speech signals.

EXAMPLE

To evaluate the new 4-band test signal and method according to the present invention, the following objective tests and comparisons to MOS test results were conducted.

Four different echo cancellers (ECs) were tested using the test signal and method of the present invention: EC1; EC2; EC3; and EC4. In addition, three different types of objective test signals were used: 1) the 4-band test signal of the present invention; 2) the CSS and the G.165 white noise signal; and 3) 8 different speech signals, each representing a different speaker (4 female, 4 male) speaking a unique pair of short sentences. Each test signal was processed through each EC at 5 different echo return loss (ERL) levels: 6, 8, 10, 12 and 14 dB. During this processing, the energy appearing at the EC's $S_{out}$ port (i.e., the echo energy not captured by the EC) was recorded. The play/record process was done by a computer system equipped with a special dual-T1 board. Any computer equipped with the necessary hardware interface and software can be used to accomplish the play/record. The computer was connected to the test EC, either directly or through a PBX. The recorded echo samples were each processed via the method according to the present invention to generate an Erep score.

To prepare the speech-based recordings for use in the subsequent MOS test, 180 ms of "delay" was added to the front of the recorded echo samples obtained when the 8 speech signals were in use to simulate the round trip delay of a digital cellular connection and then these were mixed with the source samples. Where significant echo energy is present in the recordings, the delay and mixing strategy colors the source samples with the echo. These mixed files were subsequently rated for quality (by 33 subjects) within an MOS test.

The criterion chosen for best objective signal is the one whose calculated Erep best correlates with the MOS results obtained in response to the speech samples that were processed. To be a generally useful test signal the absolute correlation obtained needs to be high.

Figure 4:
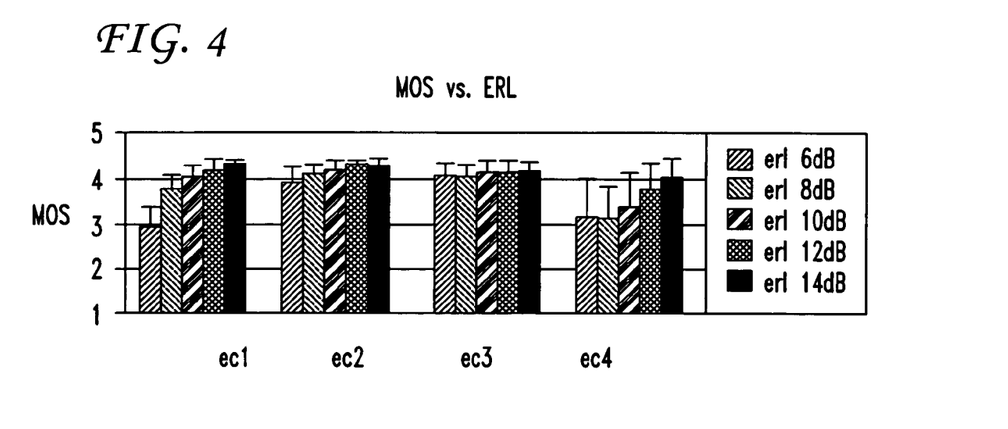
FIG. 4 shows the MOS result for four ECs tested with the test signal of the present invention at 5 ERL levels.

FIG. 4 shows the MOS result for each of the four ECs at each of the 5 ERL levels. The error bars are standard deviation. From the graph it can be seen that ECs 1, 2 and 4 exhibit the expected positive relationship between MOS and ERL. For EC3, the MOS is flat across the ERL range. The difference among ECs is likely due to the complex result of different adaptive filter designs working in conjunction with different NLP thresholds. That said, it is expected that all ECs will show full operation (convergence) at and above some ERL level.

Figure 5:
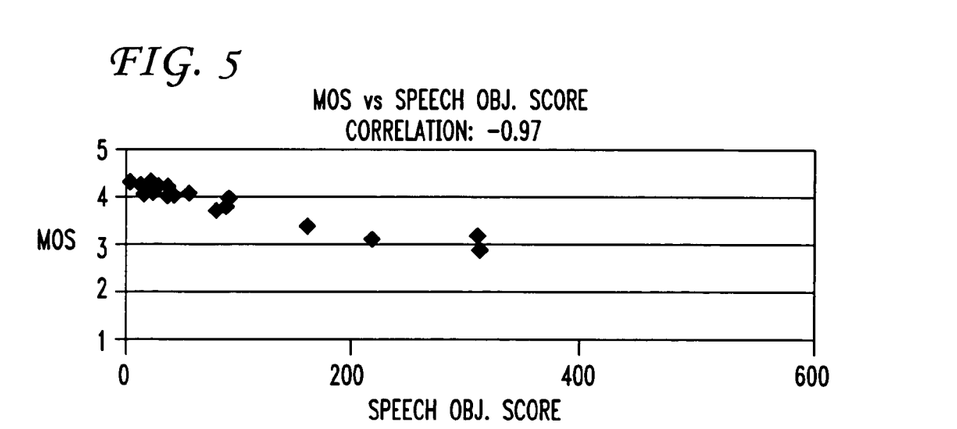
FIG. 5 plots the tested relationship between the Erep calculated on the recordings made with the speech signals and the MOS results across the four ECs of FIG. 4.

FIG. 5 plots the relationship between the Erep calculated on the recordings made with the speech signals and the MOS results across the four ECs. Each data point is the mean of 8 speaker files. The obtained correlation of −0.97 is very high, although it is somewhat expected since both the calculated Erep and MOS data are based on the same recordings.

Figure 6:
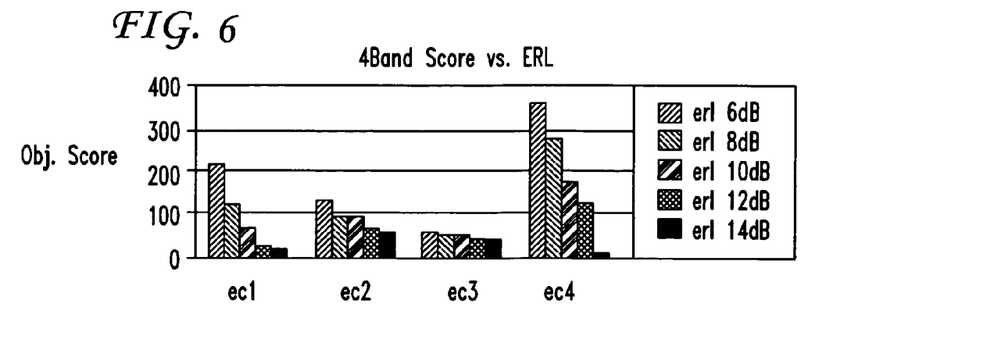
FIG. 6 plots the tested Erep for the 4-band signal as a function of both EC and ERL for the four ECs of FIGS. 4 and 5.

FIG. 6 plots the Erep for the 4-band signal as a function of both EC and ERL. The general shape is in good agreement with the MOS results in FIG. 4, i.e., the Erep for EC3 is little affected by the ERL manipulation whereas a greater ERL effect is seen for the other 3 ECs in the sample.

Figure 7A:
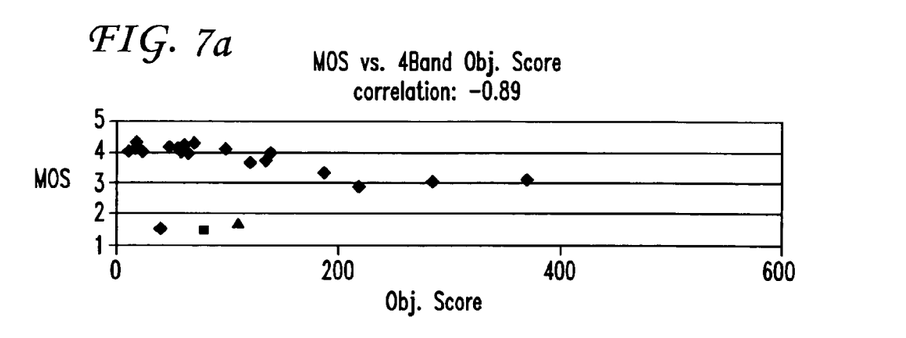
FIGS. 7a, 7b and 7c plot MOS against the tested Erep for each of the 4-band, white noise and CSS signals.
Figure 7B:
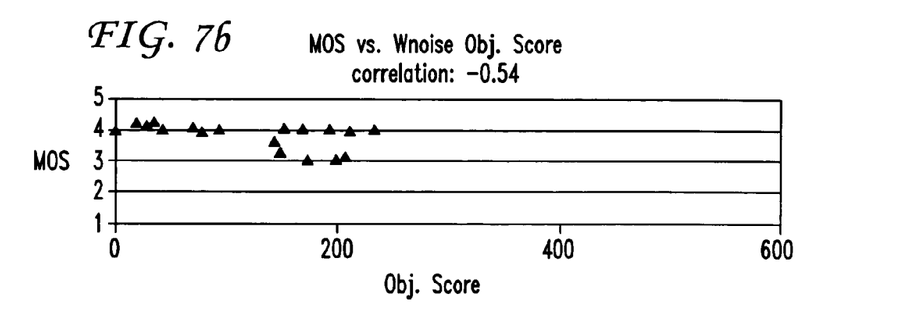
Figure 7C:
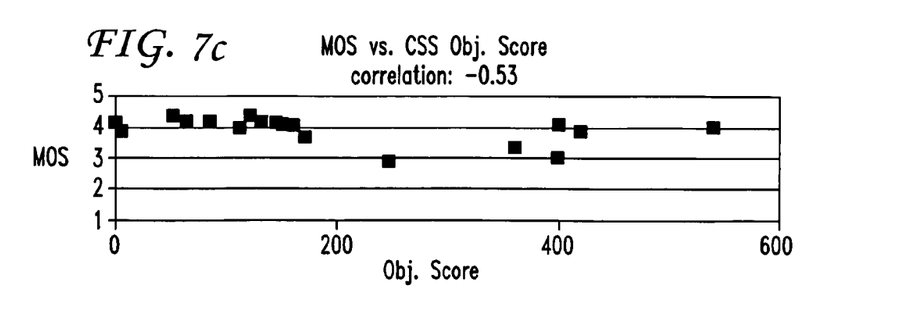

FIGS. 7a, 7b and 7c plot MOS (collapsed over the EC variable) against Erep for each of the 4-band, white noise and CSS signals. The 4-band signal obviously correlates best with the MOS score. It can be seen that the MOS score stays above 4 when the Erep is below 100. That suggests for the current 4-band signal level that if the score is below 100 the echo is not noticeable. The data presented in FIG. 5, based on the Erep for speech signals, would lead to a similar conclusion for the test signal. The overall data suggested that a pass/fail criterion of Erep<100 might be too stringent. Thus, taking the ERL variable into consideration, the criterion can be relaxed slightly whereby Erep<200 for ERLs>10 can be adopted, since ERLs below 10 dB are rarely encountered in the field.

Figure 8:
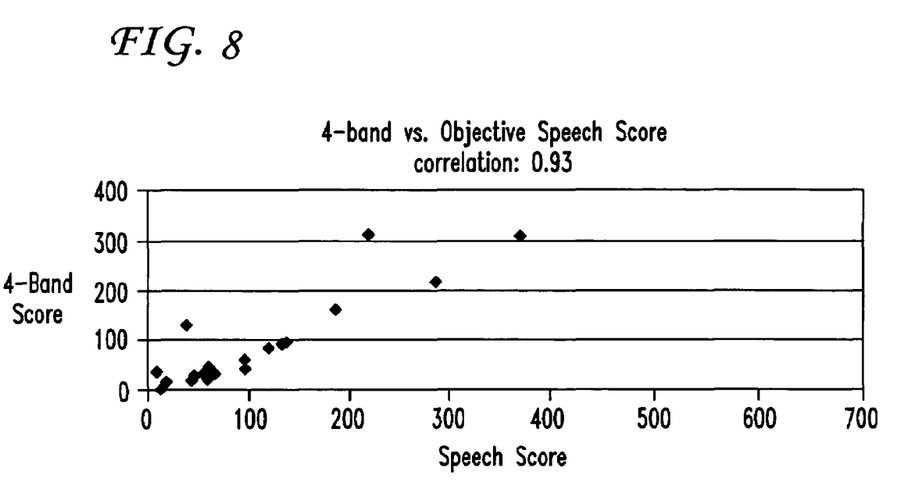
FIG. 8 shows the correlation between the 4-band test signal results and the speech samples' Erep score.

Another relationship of interest is that between the 4-band signal's Erep and the speech sample's Erep. As shown in FIG.

8, the 4-band signal results correlate very high with the speech sample results. This lends further support for the utility of the 4-band signal of the present invention.

As a result of the present invention, a better objective test signal and an associated measurement method are provided. By using a more accurate test signal, a network service provider will be able to reduce its costs of conducting pre-deployment echo canceller testing. Although the focus here was on echo canceller convergence speed, the 4-band test signal and measurement algorithm should be useful in testing other echo canceller performance areas since the underlying factor, residual echo, is constant.

While there has been described what is presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. Test equipment for testing an echo canceller, the test equipment comprising a signal generator to generate a white noise test signal associated with an overall frequency band, the white noise test signal including a plurality of high-level white noise time segments each of which is separated by a low-level white noise time gap, the high-level white noise time segments including at least:
    a pair of first segments associated with a first frequency band of the overall frequency band;
    a pair of second segments following the first segments and associated with a second frequency band of the overall frequency band, the second frequency band being higher than the first frequency band;
    a pair of third segments following the second segments and associated with a third frequency band of the overall frequency band, the third frequency band being higher than the second frequency band; and
    a pair of fourth segments following the third segments and associated with a fourth frequency band of the overall frequency band, the fourth frequency band being higher than the third frequency band.

2. A method of testing an echo canceller, the method comprising:
    generating a white noise test signal that includes a plurality of high-level white noise time segments each of which is separated by a low-level white noise time gap, the high-level white noise time segments including at least a pair of first segments associated with a first frequency band, a pair of second segments following the first segments and associated with a second frequency band that is higher than the first frequency band, a pair of third segments following the second segments and associated with a third frequency band that is higher than the second frequency band, and a pair of fourth segments following the third segments and associated with a fourth frequency band that is higher than the third frequency band;
    transmitting the generated white noise test signal to the echo canceller;
    receiving at least one echo output signal from the echo canceller, the echo output signal resulting from the white noise test signal; and
    measuring level and duration of the received at least one echo output signal.

3. A computer-readable storage medium comprising operational instructions that, when executed by a processing device, cause the processing device to:
    generate a white noise test signal that includes a plurality of high-level white noise time segments each of which is separated by a low-level white noise time gap, the high-level white noise time segments including at least a pair of first segments associated with a first frequency band, a pair of second segments following the first segments and associated with a second frequency band that is higher than the first frequency band, a pair of third segments following the second segments and associated with a third frequency band that is higher than the second frequency band, and a pair of fourth segments following the third segments and associated with a fourth frequency band that is higher than the third frequency band;
    transmit the generated white noise test signal to the echo canceller;
    receive at least one echo output signal from the echo canceller, the at least one echo output signal resulting from the white noise test signal; and
    measure level and duration of the received at least one echo output signal.

4. The test equipment as defined in claim 1, wherein each high-level white noise time segment of the plurality of high-level white noise time segments has a duration of about 350 msec.

5. The test equipment as defined in claim 1, wherein the low-level white noise gap has a duration of about 150 msec.

6. The test equipment as defined in claim 1, wherein the low-level white noise time gap has a level of about −65 dBm.

7. The method as defined in claim 2, further comprising:
    calculating a performance score based on the measured level and duration of the at least one echo output signal.

8. The method as defined in claim 2, wherein echo output signal has a duration greater than about 5 msec and a level greater than about −50 dBm.

9. The method as defined in claim 7, wherein calculating the performance score comprises:
    multiplying the measured level and duration of each output echo signal of the at least one echo output signal to obtain a product; and
    summing the product of each output echo signal of the at least one echo output signal.

10. The method as defined in claim 2, wherein:
    the first frequency band of the first segments is from about 0 kHz to about 1 kHz;
    the second frequency band of the second segments is from about 1 kHz to about 2 kHz;
    the third frequency band of the third segments is from about 2 kHz to about 3 kHz; and
    the fourth frequency band of the fourth segments is from about 3 kHz to about 3.5 kHz.

11. The method as defined in claim 2, wherein each high-level white noise time segment of the plurality of high-level white noise time segments has a level of about −18 dBm.

12. The method as defined in claim 2, wherein each high-level white noise time segment of the plurality of high-level white noise time segments has a duration of about 350 msec.

13. The method as defined in claim 2, wherein the low-level white noise time gap has a duration of about 150 msec.

14. The method as defined in claim 2, wherein the low-level white noise time gap has a level of about −65 dBm.

15. The test equipment as defined in claim 1, wherein:
    the first frequency band of the first segments is from about 0 kHz to about 1 kHz;
    the second frequency band of the second segments is from about 1 kHz to about 2 kHz;
    the third frequency band of third segments is from about 2 kHz to about 3 kHz; and the fourth frequency band of the fourth segments is from about 3 kHz to about 3.5 kHz.

16. The test equipment as defined in claim 1, wherein the white noise test signal has an overall frequency band from about 0 kHz to about 3.5 kHz.

17. The test equipment as defined in claim 1, wherein the white noise test signal has a period of about 3900 msec.

18. The test equipment as defined in claim 1, wherein each high-level white noise time segment of the plurality of high-level white noise time segments has a level of about −18 dBm.

19. The computer-readable storage medium as defined in claim 3, further comprising operational instructions that, when executed by the processing device, cause the processing device to:
 calculate a performance score based on the measured level and duration of the at least one echo output signal.

20. The computer-readable storage medium as defined in claim 3, wherein the at least one echo output signal has a duration greater than about 5 msec and a level greater than about −50 dBm.

21. The computer-readable storage medium as defined in claim 3, wherein instructions that cause the processing device to calculate the performance score comprise instructions that, when executed by the processing device, cause the processing device to:
 multiply the measured level and duration of each output echo signal of the at least one echo output signal to obtain a product; and
 sum the product of each output echo signal of the at least one echo output signal.

22. The computer-readable storage medium as defined in claim 3, wherein:
 the first frequency band of the first segments is from about 0 kHz to about 1 kHz;
 the second frequency band of the second segments is from about 1 kHz to about 2 kHz;
 the third frequency band of the third segments is from about 2 kHz to about 3 kHz; and
 the fourth frequency band of the fourth segments is from about 3 kHz to about 3.5 kHz.

23. The computer-readable storage medium as defined in claim 3, wherein each high-level white noise time segment of the plurality of high-level white noise time segments has a duration of about 350 msec.

24. The computer-readable storage medium as defined in claim 3, wherein the low-level white noise time gap has a duration of about 150 msec.

25. The computer-readable storage medium as defined in claim 3, wherein the low-level white noise time gap has a level of about −65.

26. The computer-readable storage medium as defined in claim 3, wherein each high-level white noise time segment of the plurality of high-level white noise time segments has a level of about −18 dBm.

* * * * *